Oct. 19, 1937.  R. F. PEO  2,096,468
VALVING ASSEMBLY FOR HYDRAULIC SHOCK ABSORBERS
Filed Sept. 25, 1936  2 Sheets-Sheet 1
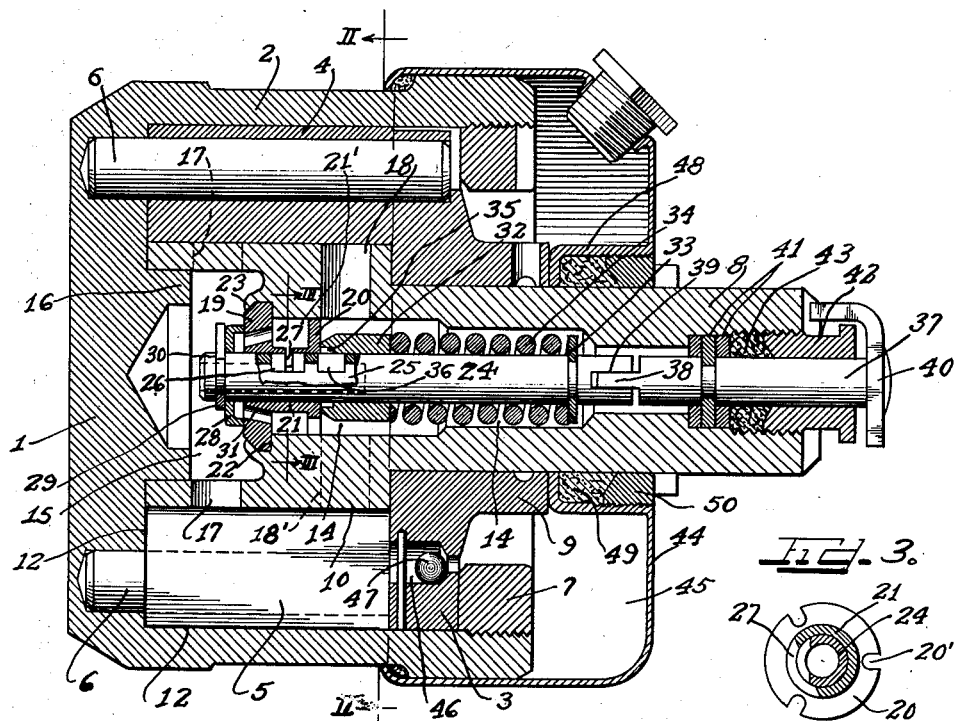
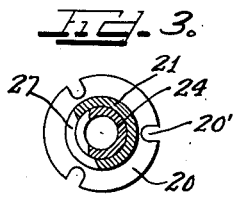
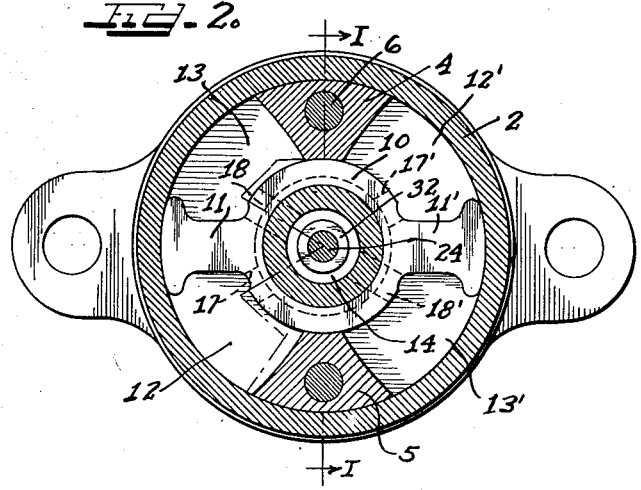
Inventor
RALPH F. PEO.

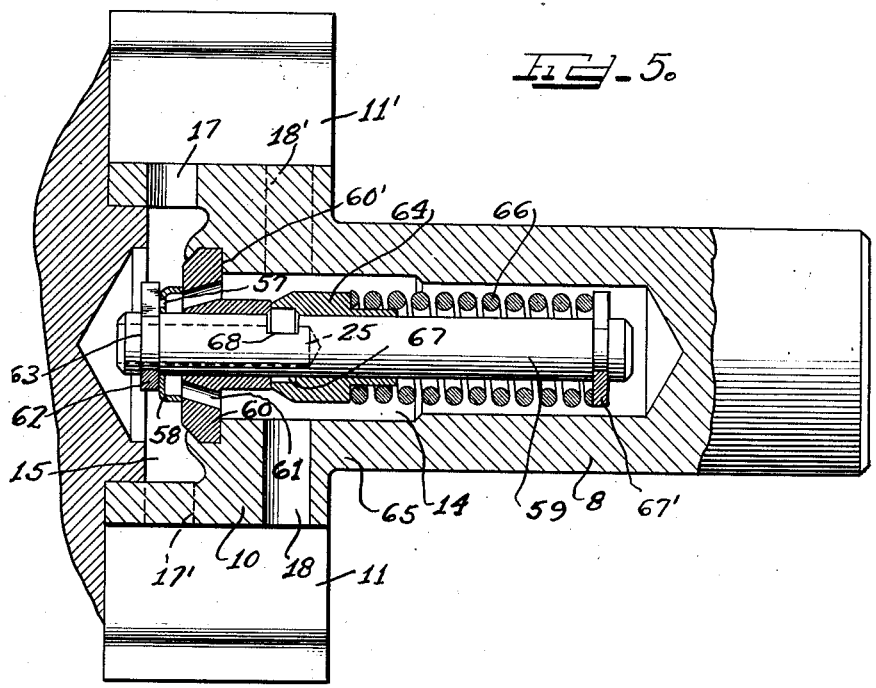
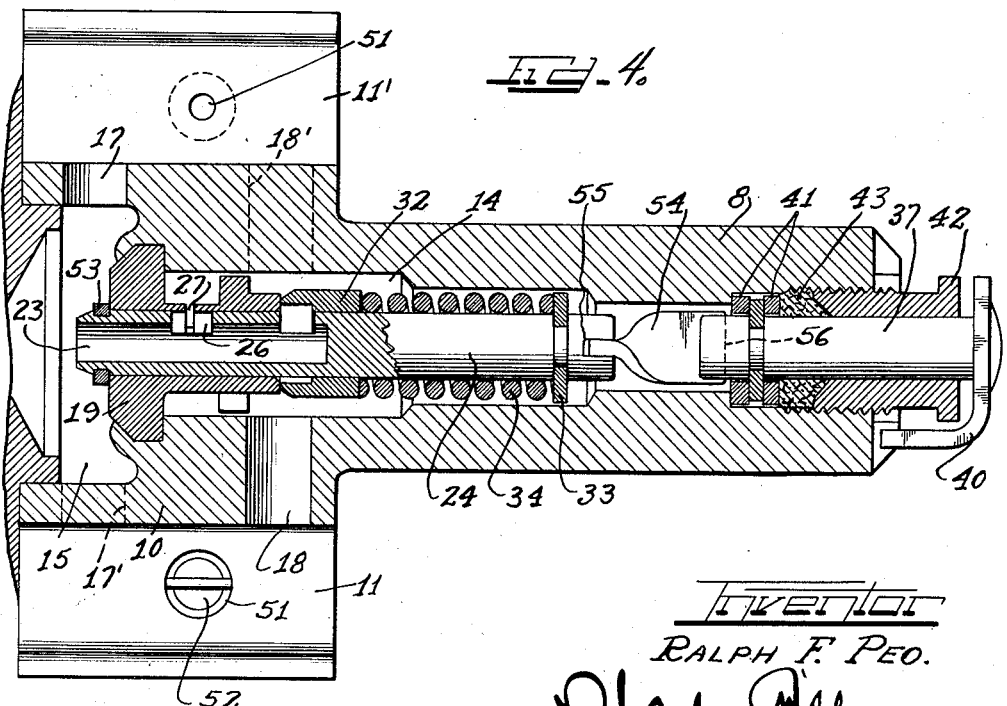

Patented Oct. 19, 1937

2,096,468

UNITED STATES PATENT OFFICE 2,096,468

VALVING ASSEMBLY FOR HYDRAULIC SHOCK ABSORBERS

Ralph F. Peo, Buffalo, N. Y., assignor to Houde Engineering Corporation, Buffalo, N. Y., a corporation of New York Application September 25, 1936, Serial No. 102,539

13 Claims. (Cl. 188—100)

This invention relates to valving structure and assembly which is particularly adaptable and serviceable for controlling the displaced hydraulic fluid flow in hydraulic shock absorbers on automotive vehicles.

An important object of the invention is to provide a valving assembly for accurately and efficiently controlling the fluid flow during both compression and rebound movement of the vehicle springs with which the shock absorbers are associated so that the desired shock absorber characteristics will always be effective.

Another object is to provide improved means for accurately setting the valve mechanism for the desired resistance to fluid flow particularly during rebound movement of the vehicle springs.

A further object is to provide more efficient blow-off or pressure release during abnormal pressure conditions during either compression or rebound movement of the vehicle springs so as to prevent injury to or unnecessary straining of shock absorber parts.

Another object is to provide a common spring for gauging and resisting the blow-off movement of blow-off valve structures.

Still another object is to provide improved arrangement for the proper proportionate difference in the blow-off limit for the compression and rebound strokes of the shock absorber piston with which the valving assembly is associated.

In general, the object of the invention is to provide a valving assembly comprising simple parts which can be economically manufactured and assembled and which can be readily set and adjusted to produce and maintain the desired shock absorbing characteristics of a hydraulic shock absorber particularly of the rotary piston type.

The various features of the invention are shown incorporated in the structure disclosed in the drawings, in which drawings:

Figure 1 is an enlarged cross section on plane I—I of Figure 2;

Figure 2 is a reduced cross section on plane II—II of Figure 1;

Figure 3 is a section on plane III—III Figure 1;

Figure 4 is a diametral cross section of a piston structure showing a modified valving assembly;

Figure 5 is a diametral section of a piston structure showing still another modified form of valving assembly.

The shock absorber to which the improved valving assembly is applied is of the so-called rotary type. The body or housing structure comprises the base 1 and the cylindrical wall 2 integral therewith. The removable end wall 3 fits into the open end of the wall 2 and has lugs 4 and 5 integral therewith and extending from diametrically opposite points within the wall 2 to abut the base 1, pins 6 extending through the wall and the lugs locking the structure against rotational displacement while an annular nut 7 threads into the end of the wall 2 to abut the wall 3 to secure this wall and the lugs against axial displacement. The lugs 4 and 5 form abutment walls or partitions for the hydraulic working chambers of the shock absorber.

The shaft 8 extends through and has bearing in the wall 3 and in the bearing extension or flange 9 on the wall, the shaft extending from the piston hub 10 from which extend the piston vanes 11 and 11'. The vanes extend between the partition lugs 4 and 5 and with these lugs divide the space within the wall 2 into high pressure working chambers 12 and 12' and low pressure working chambers 13 and 13'.

The shaft has the bore 14 which continues into the piston hub 10 and is extended at the inner end of the hub to provide the recess 15, which recess receives the boss 16 extending from the base 1 so as to afford additional bearing support for the piston structure. The recess 15 is connected with the high pressure working chambers 12 and 12' by passages 17 and 17' through the hub wall surrounding the recess. The bore 14 is connected with the low pressure working chambers 13 and 13' by passages 18 and 18' through the hub 10.

Referring to Figures 1 to 3, in the inner end of the bore 14 is a valve seat frame comprising the inner wall 19, the outer wall 20 and the intervening neck 21. The wall 19 seats against a shoulder 22 against which it is rigidly held as by deflecting thereagainst a part of the surrounding hub metal, as indicated at 23. The outer wall 20 engages the wall surrounding the bore 14 to assist in properly aligning the frame. The frame is interposed between the high pressure flow passages 17 and 17' and the low pressure flow passages 18 and 18', the wall 20 having one or more passages 20' therethrough for connecting the bore 14 outside of the wall 20 with the space 21' surrounding the neck 21 between the walls 20 and 19.

Extending within the shaft bore 14 and through the bore of the seating frame is the valve member 24 shown in the form of a cylindrical rod, this valve member at its inner end having the bore 25 communicating with the recess 15. The valve member is transversely slotted on one side to form a port 26 for cooperation with an orifice slit 27 through the neck 21 and extending a distance circumferentially along the neck, the neck being preferably of reduced thickness along the orifice so that the orifice is of small depth. The degree of overlap of the orifice slit by the valve port 26 determines the size of the orifice passageway for the flow of the displaced hydraulic fluid during rebound movement of the vehicle springs with which the shock absorber is associated.

On the inner end of the valve member 24 is a cup-shaped valve 28 for seating at its rim edge against the wall 19 of the valve seating frame, a suitable key 29 seated in the annular channel 30 in the valve member preventing displacement of the valve 28. Through the wall 19 are a number of ports 31 through which passage is closed when the valve 28 seats against the wall.

Outside of the wall 20 of the seating frame, a high pressure blow-off valve member 32 is slidable on the valve member 24, the blow-off valve being in the form of a sleeve. At its outer end, the valve member 24 has an abutment washer 33 clamped thereto and between this washer and the blow-off valve 32 a helical spring 34 encircles the valve member. This spring tends to hold the blow-off valve member 32 seated at its inner end against the wall 20 and the spring also serves to yieldably hold the valve 28 seated against the wall 19, this valve 28 controlling the hydraulic fluid flow during compression movement of the vehicle spring with which the shock absorber is associated.

At its inner end the blow-off valve 32 is counterbored to provide the annular recess 35 which communicates with the valve bore 25 through a port 36 which may be formed by transversely slotting the valve 24.

Describing the operation, during rebound movement of the vehicle spring, the displaced hydraulic fluid flows from the high pressure working chambers 12 and 12' through the passages 17 and 17' and recess 15 and into the valve bore 25 from where the flow is through the orifice formed by the valve port 26 and the slit 27 and into the space 21' from where the flow is through the passages 20', the bore 14, and the passages 18 and 18' to the low pressure working chambers 13 and 13'. Under normal pressure conditions all of the flow will be through the restricted orifice, but under abnormal pressure conditions excess pressure acting against the blow-off valve 32 will shift this valve against the resistance of the spring 34 for unseating thereof from the wall 20 so that some of the fluid may flow directly from the valve bore 25 into the bore 14 and to the low pressure working chambers.

During compression movement of the vehicle spring the displaced fluid will flow through the passages 18 and 18' through the bore 14 and into the space 21' and then through the restricted orifice 27 into the valve bore 25 and to the high pressure working chambers. The fluid will also flow through the ports 31 against the valve 28 for sufficient unseating of this valve against the resistance of the spring 34 for increase in the flow passageway, the degree of opening of the valve 28 being in accordance with the degree of pressure exerted against the valve. It will be noted that the recess 35 in the blow-off valve 32 is quite shallow and that the diameter of the valve 28 is comparatively large so that much less pressure will be required to unseat the valve 28 than to unseat the valve 32. If the orifice 27 is not sufficient to alone carry the fluid flow during the compression movement, the pressure acting against the large area valve 28, will readily unseat the valve for freer flow. During rebound movement of the vehicle springs, the pressure may rise much higher before the blow-off valve 32 is unseated on account of the restricted pressure area of this valve. Thus by the proper dimensioning of the pressure areas of the respective valves the proper proportionate difference in the blow-off limit of the shock absorber during rebound or compression strokes can readily be obtained and assured.

As shown, the end of the blow-off valve 32 is beveled or tapered so as to leave only a thin edge for seating engagement against the wall 20, and such arrangement will prevent sudden increase of pressure against the blow-off valve as it is being unseated. It will also be noted that the single spring 34 controls the unseating of both of the blow-off valves 28 and 32, this arrangement materially simplifying the valving assembly and reducing the cost thereof.

As shown in Figure 1, provision is made for readily adjusting from the exterior of the shock absorber the size of the restricted orifice formed by the valve port 26 and the slit 27. A shaft 37 extends into the outer end of the bore 14 and has tongue and groove connection with the end of the valve member 24. As shown the shaft 37 has the tongue 38 for extending into the groove 39 in the valve, and at the outer end of the shaft 37 is a handle 40 for turning the shaft and thereby the valve for adjustment of the overlap by the valve port 26 of the orifice slit 27 for the desired size of orifice passageway. Washers 41 and a plug 42 align and journal the shaft 37, the plug 42 threading into the ends of the shaft to compress packing material 43 around the shaft so as to prevent leakage of hydraulic fluid to the exterior of the shock absorber from the shaft bore.

As shown on Figure 1, a sheet metal cap 44 is clamped around the end of the wall 2 to provide a hydraulic fluid reservoir 45 from which replenishing fluid flows to the hydraulic working chambers through passages 46 controlled by check valves 47, in a manner well understood in the art. The cap 44 has the deflection 48 for abutting the bearing flange 9 and forming a pocket for receiving packing material 49 held therein and around the shaft by a plug 50.

In the modified structure of Figure 4, the valving arrangement is substantially the same as that shown in Figure 1 so far as the flow and control on rebound is concerned. Instead of having the compression flow controlling valve form part of the valving assembly in the piston structure bore, such flow is through passages 51 through the vanes controlled by check valves 52.

The valve 24 at its inner end receives the abutment collar 53 which is held against the wall 19 by the force of the spring 34 which spring controls the blow-off operation of the valve 32 under abnormal pressure conditions when the orifice formed by the valve port 26 and the slit 27 cannot carry the flow. The force of the spring also holds the valve in adjusted position relative to the orifice slit 27.

Instead of having the adjusting shaft 37 connecting directly with the valve 24, as in the arrangement of Figure 1, a universal coupling link 54 may be interposed as shown in Figure 4. The coupling member shown is a rectangular plate of metal twisted to bring its ends into 90° displacement, one of the ends then engaging in the groove 55 in the outer end of the valve 24 and the other end engaging in the groove 56 in the inner end of the shaft 37.

In the arrangement of Figures 1 and 4, the unitary valve assembly is inserted into the shaft bore from the inner end thereof and is secured in place as by deflecting part of the piston hub metal against the wall 19, as has already been explained. The external adjusting means involving the shaft 37 is then applied in the outer end of the shaft bore. By having the separable coupling connection between the valve assembly and the exterior adjusting means the valve assembly can be accurately adjusted and tested for valve movement, spring tension, etc. before insertion of the assembly in the shaft bore and thereafter further adjustment, if necessary, may be made by means of the exterior adjusting means. The advantage of the interposed coupling member such as 54, as shown in Figure 4, is that the universal joint provided between the valve assembly and the exterior adjusting means will leave the valve assembly free to function easily and accurately without strain.

Figure 5 shows a simple modified arrangement in which the rebound fluid flow is metered by an orifice 57 in the low pressure blow-off valve 58. The valve 59 extends through the bore 14 of the piston structure and through the bore of the seating frame 60 secured against the shoulder 61' at the inner end of the shaft bore. The low pressure blow-off valve 58 is cup shaped and seats at its rim against the wall 60 to normally close the ports 61 through the wall. A U-shaped key 62 engaging in the channel 63 in the valve end forms an abutment for the valve 58.

The high pressure blow-off valve 64 seats against the inner end of the extension neck 65 on the wall 60, the spring 66 between the valve and the abutment washer 67 tending to hold the valve 64 seated, the spring also tending to hold the blow-off valve 58 seated. The blow-off valve 64 has the counterbore or recess 67 with which the valve port 68 is in alignment.

During rebound movement of the vehicle spring, the displaced hydraulic fluid flows from the high pressure working chambers of the shock absorber through the passages 17 and 17' into the recess 15 and from there through the metering orifice 57 in the valve 58, and through the ports 65 into the bore 14 from where it flows through passages 18 and 18' to the low pressure working chambers of the shock absorber. Under normal pressure conditions the flow will all be through the orifice 57 but under abnormal pressure conditions the pressure of the fluid through the valve bore 25 and against the blow-off valve 64 will unseat this valve against the resistance of the spring 66 for additional release flow passageway.

During compression movement of the vehicle springs, the displaced fluid will flow from the low pressure chambers through the passages 18 and 18' into the bore 14, through ports 65 into the blow-off valve 58 and through the orifice 57 and to the high pressure working chambers. If the orifice 57 cannot accommodate the flow, the pressure against the valve 58 will cause unseating thereof against the resistance of spring 66 for additional flow passageway. The available pressure area of the valve 58 and that of the blow-off valve 64 is so relatively dimensioned that there will be the proper proportionate difference in the blow-off resistances of the valves for the proper shock absorbing action during the compression and rebound movements of the vehicle springs.

As shown in Figure 5, the shaft bore may be closed at its outer end so that the driving assembly is not accessible from the exterior of the shock absorber. The proper setting of the valve and adjustment thereof and of the spring are made before the assembly is inserted into the shaft bore.

I have shown practical and efficient embodiments of the various features of my invention but I do not desire to be limited to the exact construction, arrangement and operation shown and described as changes and modifications may be made without departing from the scope of the invention.

I claim as follows:

1. A valve assembly for controlling the displaced hydraulic fluid flow in a hydraulic shock absorber, comprising a seat member, a supporting member movable in said seat member, a valve slidable on said supporting member at one side of said seat member, a second valve on said supporting member at the other side of said seating member, passageways controlled by said valves, and a common spring normally holding said valves to close said passageways and resisting passageway opening movement of said valves.

2. A valving assembly for controlling the displaced hydraulic fluid in a hydraulic shock absorber, comprising a seat member, a supporting member extending through and slidable in said seat member, a valve slidable on said support member at one side of said seat member, a second valve at the other side of said seat member slidable with said supporting member, fluid flow passageways controlled by said valves and normally closed thereby, and a common spring for resisting opening movement of said valves.

3. A valve assembly for controlling the displaced hydraulic fluid flow in a hydraulic shock absorber, comprising a seat member having a bore, a supporting member slidable axially in said bore, a valve slidable on said supporting member at one side of said seat member, a second valve movable with said supporting member at the other side of said seat member, fluid flow passageways controlled by said valves, and a common spring tending to normally hold said valves seated against the opposite sides of said seat member to close said passageways and for resisting movement of said valves to open said passageways.

4. A valve assembly for controlling the displaced hydraulic fluid flow in a hydraulic shock absorber, comprising a seat member having a bore therethrough, a supporting member extending through and slidable in said bore, a pressure responsive valve slidable on said supporting member at one side of said seat member, a second valve mounted on said supporting member at the other side of said seat member, fluid flow passageways controlled by said valves, an abutment on said supporting member, and a spring interposed between said abutment and one of said valves, said spring tending to normally position said valves for closure of said passageways but yielding to fluid pressure against said valves for movement thereof to open said passageways.

5. A valve assembly for controlling the flow of displaced hydraulic fluid in a hydraulic shock absorber, comprising a seat member, blow-off valves supported to seat against opposite sides of said seat member and controlling separate fluid flow passages, a common spring tending to hold said valves seated to close said passageways and resisting opening of said valves by the fluid pressure, one of said valves presenting a greater pressure area to the fluid than the other valve.

6. In a valving assembly for controlling the hydraulic fluid flow in a hydraulic shock absorber, a main valve and a constant flow passageway controlled thereby, a blow-off valve responsive to low pressure, a second blow-off valve responsive only to high pressure, said blow-off valves controlling separate fluid flow passageways paralleling said constant flow passageway, and a common spring resisting the opening of said passageways by said blow-off valves.

7. A valving assembly for controlling the fluid flow in a hydraulic shock absorber, comprising a seat member, a main valve supported in said seat member, said main valve and said seat member having passageways relatively adjustable to define a permanently open orifice for the flow of displaced fluid, blow-off valves carried by said main valve, means defining additional flow passageways respectively controlled by said blow-off valves, said blow-off valves being responsive to fluid pressure, and a common spring resisting the opening of said additional passageways by said blow-off valves.

8. A valving assembly for controlling the fluid flow in a hydraulic shock absorber, comprising a seat member, a main valve supported in said seat member, said main valve and said seat member having passageways relatively adjustable to define a permanently open orifice for the flow of displaced fluid, blow-off valves carried by said main valve, means defining additional flow passageways respectively controlled by said blow-off valves, said blow-off valves being responsive to fluid pressure, and a common spring resisting the opening of said additional passageways by said blow-off valves, one of said blow-off valves presenting greater pressure area to the fluid than the other blow-off valve whereby it will be opened under less pressure.

9. A unitary valving assembly for controlling the fluid flow in hydraulic shock absorbers, comprising a restricted passage permanently open to fluid flow in either direction through said valve assembly, means providing additional passageways through said valve assembly, a blow-off valve responsive only to higher fluid pressure for opening one of said additional passageways, a second blow-off valve responsive to comparatively low fluid pressure for controlling said other additional passageway, and a common spring resisting passageway opening movement of said blow-off valves.

10. A valving assembly for controlling the fluid flow in a hydraulic shock absorber having a piston structure with an axial bore connected with the working chambers of the shock absorber, said valving assembly comprising a seat structure mounted in said shaft bore at the inner end thereof, a valve journalled in said seat structure, said valve and seat structure having passageways adjustable by rotary movement of said valve to define a restricted metering orifice for fluid flow, an adjusting member extending into the outer end of said piston structure bore from the exterior thereof, and a detachable universal coupling connection between said adjusting member and said valve for moving said valve for adjustment of said orifice.

11. A valving assembly for controlling the fluid flow in a hydraulic shock absorber, comprising a seat member, a main valve supported in said seat member, said main valve and said seat member having overlapping passageways defining a permanently open orifice for the flow of displaced fluid, means providing additional passageways through said valve assembly, a blow-off valve for one of said additional passageways and another blow-off valve for the other additional passageway, a common spring resisting opening of said additional passageways by said blow-off valves, said main valve being rotatable for varying the overlap of the passageways in said main valve and seat member and thereby the resistance to flow through said orifice.

12. A valving assembly for controlling the fluid flow in a hydraulic shock absorber, comprising a seat member, a main valve supported in said seat member, said main valve and said seat member having overlapping passageways defining a permanently open orifice for the flow of displaced fluid, means providing additional passageways through said valve assembly, a blow-off valve for one of said additional passageways and another blow-off valve for the other additional passageway, a common spring resisting opening of said additional passageways by said blow-off valves, said main valve being rotatable for varying the overlap of the passageways in said main valve and seat member and thereby the resistance to flow through said orifice, and an adjusting member for rotating said main valve, said adjusting member having a detachable universal coupling connection with said valve.

13. A unitary valving assembly for controlling the fluid flow in a hydraulic shock absorber, comprising a seat member, a main valve supported in said seat member, said main valve and said seat member having cooperating passageways defining a restricted orifice, said main valve having a chamber therein, means defining a main passageway for the flow of fluid, said main passageway including said orifice and said valve chamber, means defining an additional passageway through said valve assembly including said valve chamber and a blow-off valve for controlling said additional passageway, a second additional passageway through said valving assembly independent of said valve chamber and a blow-off valve controlling said second additional passageway, and a common spring means resisting passageway opening movement of said blow-off valves.

RALPH F. PEO.